W. A. JOHNSON.
AUTOMOBILE SHOCK ABSORBER.
APPLICATION FILED APR. 17, 1914.
1,136,469.
Patented Apr. 20, 1915.
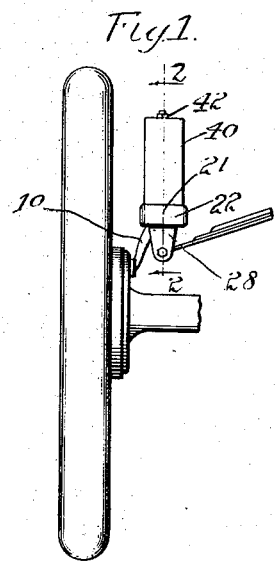
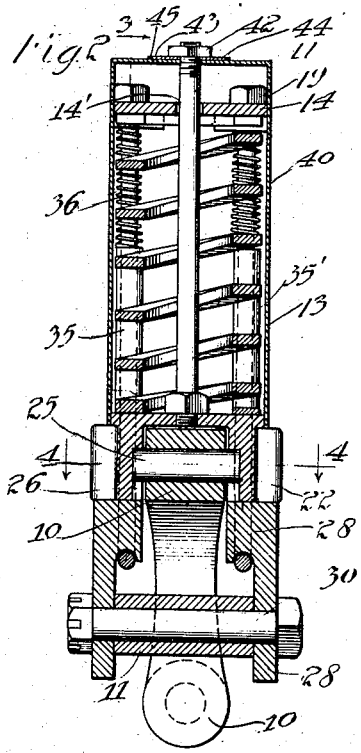
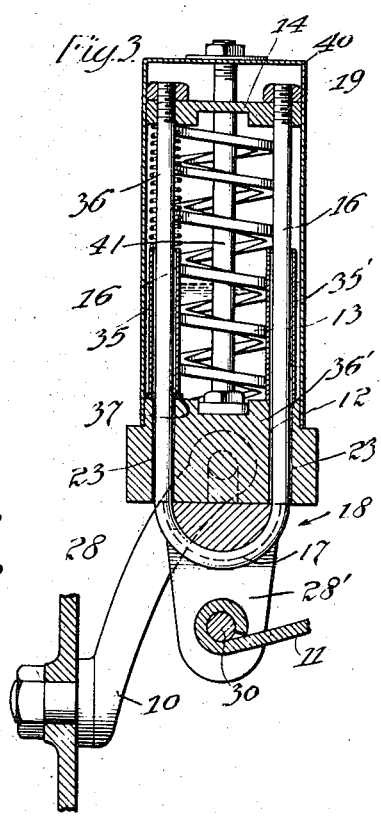
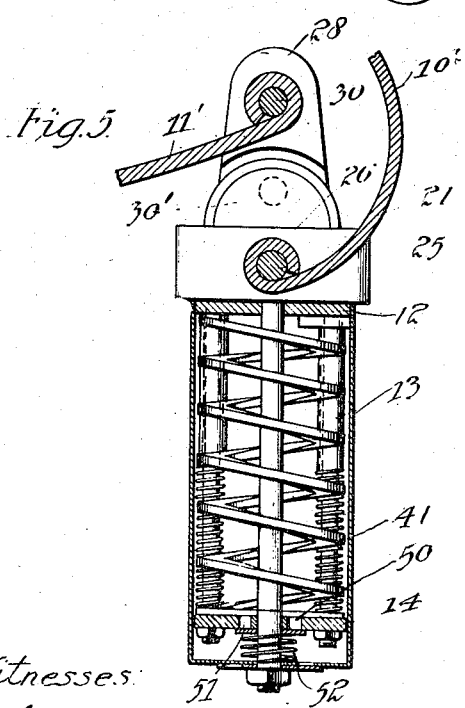
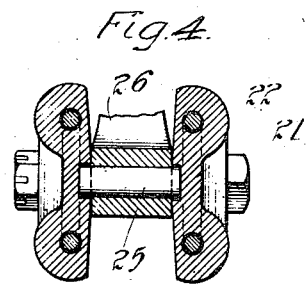
Inventor:
William A. Johnson,

UNITED STATES PATENT OFFICE.

WILLIAM A. JOHNSON, OF CHICAGO, ILLINOIS.

AUTOMOBILE SHOCK-ABSORBER.

1,136,469.  Specification of Letters Patent.  Patented Apr. 20, 1915.

Application filed April 17, 1914. Serial No. 832,461.

*To all whom it may concern:*

Be it known that I, WILLIAM A. JOHNSON, a citizen of the United States, residing at Chicago, in the county of Cook and State of Illinois, have invented certain new and useful Improvements in Automobile Shock-Absorbers, of which the following is a specification.

My invention relates to improvements in automobile shock absorbers, and more particularly to shock absorbers of the auxiliary-spring type, supplementing the main springs of the car.

One of the salient objects of my invention is to provide a shock absorber which may be used in either erect or pendent position, according to the relation of the hangers or suspension points upon the car, and having its spring and spring-guiding mechanism completely housed and constructed to retain an oil bath within the housing to prevent noise and wear by affording constant lubrication.

Another object of my invention is to provide a construction which will not cramp or bind the relatively movable reciprocating parts of the shock absorber under the twisting strains thrown thereon in the rough use of the automobile, as for instance, when the car runs into and out of ruts nearly parallel with its course of travel.

A further object of my invention is to provide an improved connection between one of the relatively reciprocating members of the shock absorber and its suspension- or hanger-member.

Further general objects of my invention are to provide a simple, neat and efficient shock absorber, the parts of which are easily manufactured, assembled and adjusted, and are interchangeable for ready replacement and repair.

In the drawings wherein I have illustrated a practical embodiment of my invention; Figure 1 is an elevation of a shock absorber embodying my invention applied in upright position to the rear spring and running gear member of a car of the "Ford" type of construction. Fig. 2 is an enlarged section on line 2—2 of Fig. 1. Fig. 3 is a vertical sectional section on line 3—3 of Fig. 2. Fig. 4 is a transverse section on line 4—4 of Fig. 2. Fig. 5 is a vertical section through a shock absorber applied in pendent position.

In Figs. 1 to 4, 10 and 11 indicate two hanger members respectively connected with the running gear and frame of an automobile, the construction specifically shown providing a hanger member in the form of a bracket 10 for attachment to a rigid part of the running gear and the hanger 11, in the form of a leaf spring, for connection with a car, said spring having its end eye below and in substantially vertical alinement with the eye of the bracket 10. This form of construction necessitates the placing of shock absorber in upright or erect position as shown in Fig. 1.

In Fig. 5 the hangers 10' and 11' are both springs, (although either might be a bracket), the former connectible to the body of the car and the latter to the running gear. In this form of construction the shock absorber will be placed in pendent position, as the hanger 10' has its eye below the hanger 11' and is bowed around the part 11'.

I preferably construct my shock absorber so that only a single absorber element need be used between the two hanger members on each side of the car.

12 indicates a head or abutment against which acts an open coiled spring structure 13, preferably a single coil of flat spring-stock, the opposite extremity of which bears against a platform 14, which is preferably a plate. The single spring coil of relatively large diameter is especially adapted for my construction but other spring arrangements might be substituted with retention of many of the advantages of my invention. In plan outline the opposing bearing members 12 and 14 are preferably substantially square. Through the corners of these two members, beyond the circle of the spring coil, pass guide rods, 16, preferably four in number, each engaging the platform 14 to move it, and extending guidedly through the head 12. For some of the purposes of my invention the guide rods 16 are, beyond the head 12, connected in pairs by yokes 17 of semi-circular form, such construction preferably being provided by bending round rod-stock into U-form to constitute U-bolts 18, the extremities of which, beyond the platform 14, are screw threaded to carry nuts 19, acting as abutments for the support of the platform 14. The yoke ends 17 of the guide members on the one hand, and the head 12 on the other, are respectively connected to the opposing hanger members 11—10 or 10'—11', so that when any shock is imparted to the running gear tending to separate the hangers, the guide rods 16 will be drawn through the head 12, carrying the platform 14 and compressing the spring structure 13.

I prefer that the head 12 shall be a casting having vertical side walls 21 each provided with posts 22 at its corners through which are made the guiding apertures 23 for the guide rods 16. These guiding apertures are preferably made large enough to afford a relatively loose fit for the rods as part of the provision against cramping or binding.

Spanning centrally across the side walls 21, and sufficiently beyond the head 12 for adequate clearance, is the pin 25 connected to the eye of one of the hangers, as 10 or 10'. To receive such pin the side walls 21 need only be recessed or socketed from their outer edges for in action the pin is held firmly in its socket, receiving only a pressure tending to seat it, under all operating conditions. The rocking connectors between the yokes 17 of the guide rods 16 and the remaining hanger member are preferably cam members in the form of segment blocks 28, having their chords resting on the flat edges of the side walls 21 and having their arcs shaped to conform to, and grooved to interfit with, the yokes 17 of the U-bolts. A connecting bolt 30 connects the two rocking blocks at an eccentric point beyond the center of curvature of the arc of the blocks. Where one of the hanger members is fixed, as is the case with the bracket 10, it is advantageous to employ a link connection between one of the reciprocating members of the shock absorber and its hanger, in order to take care of the elongation of the spring member 11 without throwing the shock absorber materially out of its vertical position. For this reason I preferably form each rocking member 28 as a link, by providing thereon, preferably integrally with the sector, ears 28' extending a suitable distance beyond the arc of the block and receiving the connecting bolt 30. By putting these ears on the outside of the blocks, increased room is afforded between the blocks to receive the spring end 11. However, such length of linkage is not necessary where the two hangers are both springs, and in such cases the construction may be shortened by locating the bolt 30 in a position indicated by 30' in Fig. 5, the eccentricity being sufficient to take care of the slight difference in the extension of the hanger-springs. As shown in full lines in Fig. 5, however, the longer linkage may be employed if preferred. It will be observed that the links 28 may rock within the arcuate yokes 17 for effective link action, but that in so rocking their chord edges act as cams to compress the spring 13, so that the links normally have a spring-governed tendency to remain in vertical position and to return thereto when rocked. Also, although the spring tension holds the parts normally in position with the yokes 17 lying snugly in the groove in the blocks, said blocks may twist slightly under twisting strains without disturbing the alinement of the guides 16 in the guiding apertures 23, as a further preventive against binding. It is my preference, although it is not essential, to make the edges of the blocks 28 overlie the recesses 26 of the side walls 21 so that, in shipping, the pins 25 are held against displacement from their sockets.

I prefer that the corner guides 16, which may, and preferably do, act as a quadrangular cage for the single spring 13, shall be provided with sleeves of fiber or like material, throughout a sufficient portion of their extent to afford centering bearing for the spring, insuring that the spring action shall be without noise and with minimum wear. These sleeves may also serve to close the guide openings 23 against oil egress when the absorber is used in an erect position. In the specific construction shown in Fig. 3, 35 is a sleeve of fiber surrounding the guide 16 and acted on by a small spring 36 coiled around the guide to bear against a packing washer 37 of leather or the like, interposed between the end of the sleeve and the portion of the head 12, immediately around the guiding aperture 23. At the right hand side of said figure, 35' represents a corresponding sleeve which, as an alternative construction, has its lower extremity tapered as at 36' and forced into a corresponding tapered counter-bore of the head 12, so dispensing with the spring 36. Either construction affords an oil-proof joint between the head and the sleeve so that the casing hereafter described may be flooded with oil to any level below the height of the sleeve 16, without danger of material oil leakage.

A rectangular oblong casing 40 incases the parts above the head 12 and interfits neatly with the head 12, to which it is suitably secured. Preferably the casing is secured in place by a rod 41, fixedly screwed in the head 12, extending through a guiding aperture 14' in the platform 14, thence through an aperture centrally in the end of the casing, and carrying the fastening nut 42.

For convenience in filling the casing with oil said casing may be provided in its end with an opening 43, arranged to be opened and closed as there is brought into or out of register therewith an opening 44 in a cover plate 45, held in position by the nut 42; this being merely one available form of affording an oil inlet at any suitable point in the casing.

In operation, it will be observed, the relative separation of the two points of connection of the shock absorber with the hanger will pull the platform 14 toward the head 12, the guide rods 16 sliding readily through the openings 23 in which they interfit rather loosely. This action is greatly facilitated by the presence of the central rod 41, (although the latter is not absolutely essential,) because the rod 41, rigid on the head 12, and having guiding passage through an aperture in the platform 14, obviates any possibility of the platform 14 pulling out of line, and causes it to travel on a right line directly toward the head 12. Double guidance is thus afforded on the one hand by the guides 16 in the head openings and on the other hand by the rigid rod 41 and platform opening, and this arrangement very effectively acts to prevent any binding of the sliding members, avoiding a trouble which seriously cripples many forms of shock absorbers, under road conditions particularly. The engagement of rod 41 with the casing 40 both aid in maintaining the rod in proper position and in giving proper rigidity and proper position to the casing.

When the shock absorber is used in pendent position it may readily be made to act as an oil-check to snub the recoil, and to this end, as shown in Fig. 5, I make the platform 14 solid, and of a size quite neatly to interfit with the casing, such platform having made therein a series of openings 50 contiguous to the guide aperture for the rod 41, these openings being covered on their under side by an outwardly opening valve, such as a leather flap 51, spring-pressed into valve closing position by a small, light spring 52 of great expansibility, interposed between the bottom of the casing and the leather valve. In this form of construction, when the platform 14 rises under shock, the oil may readily force its way through the valved openings 50 against the resistance of the light spring 52, so at the commencement of the return movement said spring and the oil body both tend to close the valve, leaving, as the only return passage for the oil, the relatively restricted space between the platform 14 and the casing wall. Thus the return of the platform 14 to original position must be slow and too active recoil is snubbed, so that on a series of successive shocks the "wave-like" vibration or continuing bouncing, of the car is prevented. The same form of construction may obviously be used when the shock absorber is in erect position, acting however as an air check, but for the simplest and the most inexpensive construction such feature may well be omitted and I have not, therefore, shown it in connection with Figs. 1 to 3.

As a detail of manufacturing procedure, making for perfection in the mechanical embodiment of my invention, I preferably enamel the casing and head exteriorly by dipping the assembled device, the enamel extending over the joint of casing and head, and completely sealing the already tight joint therebetween.

While I have herein described in some detail, for purposes of full disclosure of my invention, particularly details of construction which I have found to be advantageous and practical, it will be apparent to those skilled in the art that many changes in the details of the mechanism might be made without departure from the spirit of my invention and within the scope of the appended claims.

Having described my invention, what I claim is:—

1. In a shock absorber, the combination with a head, adapted for connection with one hanger member of an automobile, an opposed platform, and an interposed spring-structure, of a plurality of guides connected for movement with the platform, and extending through the head for connection with a second automobile hanger, a casing for said parts, having a bottom and a guide for said platform extending through the same and rigidly connected with the head and the casing bottom and securing said casing in place.

2. In a shock absorber, the combination with a head adapted for connection with an automobile hanger-member, an opposed platform, and an interposed spring; of guides connected with said platform for movement therewith guidedly extending through said head, and beyond said head connected by an arcuate yoke, and a segment block engaged between said head and said yoke, for a rocking movement against the tension of said spring.

3. In a shock absorber, the combination of a head, an opposed platform, and an interposed spring, of two pairs of guides connected with said platform to move therewith, guidedly extending through the head, and connected in pairs by two arcuate yokes, segment blocks between the respective yokes and the head, arranged to rock against the tension of the spring means, and a hanger receiving connection associated with said blocks.

4. In a shock absorber, the combination of a head, an opposed platform, interposed spring means, a pair of guide members extending from said platform for movement therewith guidedly through the head, and a rocking link coacting with the said pair of guides in said head by its rocking movement to tension said spring, whereby said link is normally spring maintained in predetermined position.

5. In a shock absorber, the combination with a head, an opposed platform, and interposed spring means, of two pairs of guides connected with the said platform for movement therewith and guidedly extending through the head, two rocking members associated with the respective pairs of guides for rocking movement to tension the spring means, and a hanger connector spanning said two rocking members and arranged for movement to rock the same.

6. In a shock absorber, the combination with a head, an opposed platform, and interposed spring means; of a pair of U-bolts having arcuate yokes, the stems of said U-bolts passing through the head and connected with the platform for movement therewith, segment blocks coacting with the yokes of said U-bolts, and a hanger connector spanning said segment blocks and arranged eccentrically to their arcuate centers.

7. In a shock absorber, the combination with a head, an opposed platform, and interposed spring means; of a pair of U-bolts having arcuate yokes, the stems of said U-bolts passing through the head and connected with the platform for movement therewith, segment blocks engaging the arcuate yokes of said U-bolts and having extension ears therebeyond, and a hanger connector spanning said ears.

8. In a shock absorber, the combination of a head having side walls, a hanger connector between the side walls, a platform opposing said head, spring means interposed between said platforms and said heads, U-bolts guidedly extending through said head and engaging said platform for movement therewith, blocks having arcuate surfaces engaging said U-bolts, and a hanger connector spanning said blocks eccentrically to their arcuate center.

9. In a shock absorber, the combination with a head having external side wall extensions, an opposed platform, and interposed spring means, of a hanger connector engaged in recesses in said side wall extensions, a pair of U-bolts having arcuate yokes, each U-bolt having its stems extending guidedly through the heads and engaging the platform, arcuate blocks engaging said arcuate yokes and normally closing said connector-receiving recesses in the side walls of the head, and a hanger connector carried by said arcuate blocks.

10. In a shock absorber, the combination of a head, a hanger connector associated therewith, a rocking link on one side of said head, a hanger connector associated therewith, a guide associated with said rocking link to be moved by the rocking of said link, and extending through said head, and spring means associated with said head and said guide operating to oppose separation of said hanger members and to be tensioned by rocking of the links.

11. In a shock absorber, the combination of a head, a casing coöperating with said head, a longitudinal rigid connection between said casing and head extending through the casing fixed in the head and securing the casing to the head, a platform in said casing guided on said rigid connections, spring means interposed between said platform and head, guide members connected with said platform and extending through said head, a hanger connector associated with said guide members and a hanger connector associated with said head.

12. In a shock absorber, the combination of a head, a casing coöperating with said head, a longitudinal rigid connection between said casing and head extending through the casing and securing it to the head, a platform in said casing guided on said rigid connection, spring means interposed between said platform and head, guide members connected with said platform and extending through said head, a hanger connector associated with said guide members, and a hanger connector associated with said head.

13. In a shock absorber, the combination of a head, a casing coöperating with said head to form a substantially closed chamber adapted to contain a body of oil, guides extending through said head into said chamber, a platform connecting said guides, spring means interposed between said platform and head, sleeves surrounding said guides and making tight joint with the head, and hanger connectors respectively connected with said guides and with said head.

14. In a shock absorber, the combination with a casing providing a bottom head and inclosing side walls, a guide extending through said head, spring means interposed between the upper end of said guide and the head, of a sleeve surrounding said guide and making tight contact with the head, whereby said casing may be filled with oil to the upper end of the sleeve without leakage around the guide.

15. In a shock absorber, the combination with a substantially closed casing having a head and an opposing end, and made in a plurality of parts, guides extending through the head, a platform on the guides, and a spring means interposed between said head and platform, of a central guide rod guidingly extending through said platform and at opposite ends fastened to said head and to the casing end to secure the casing parts together, and a valve structure associated with said platform to open and close apertures provided therein as the platform is respectively moved toward and from the head, said valve structure surrounding and being guided on said central rod.

16. In a shock absorber, the combination of a rectangular casing, a substantially square head therefor, a substantially square platform slidable within the casing, a circular coiled spring within the casing between the head and platform, rods extending guidedly through corners of the head and engaging the platform beyond the spring-confines, a central rod carried by the head and engaging the end of the casing, and retaining means on said rod, fastening said casing axially to the head.

17. In a shock absorber, the combination of a rectangular casing, a substantially square head therefor, a substantially square platform slidable within the casing, a circular coiled spring within the casing between the head and platform, rods extending guidedly through corners of the head and engaging the platform beyond the spring-confines, a central rod carried by the head and engaging the end of the casing, and guidingly engaging the platform, and means on said rod fastening the casing axially to said head.

In testimony whereof I hereunto set my hand in the presence of two subscribing witnesses.

WILLIAM A. JOHNSON.

In the presence of—
GEO. T. MAY, Jr.,
MARY F. ALLEN.